(12) United States Patent
Carnevali

(10) Patent No.: US 8,925,877 B2
(45) Date of Patent: Jan. 6, 2015

(54) VEHICLE SEAT MOUNT

(76) Inventor: Jeffrey D. Carnevali, Seattle, WA (US)

( * ) Notice: Subject to any disclaimer, the term of this patent is extended or adjusted under 35 U.S.C. 154(b) by 921 days.

(21) Appl. No.: 12/459,413

(22) Filed: Jun. 30, 2009

(65) Prior Publication Data
US 2010/0327131 A1    Dec. 30, 2010

(51) Int. Cl.
| | | |
|---|---|---|
| A47F 5/00 | (2006.01) | |
| A47F 7/00 | (2006.01) | |
| F16M 11/00 | (2006.01) | |
| F16M 13/00 | (2006.01) | |
| F16M 13/02 | (2006.01) | |
| F16M 11/16 | (2006.01) | |
| F16M 11/14 | (2006.01) | |
| F16M 11/20 | (2006.01) | |
| B60R 11/02 | (2006.01) | |
| B60R 11/00 | (2006.01) | |

(52) U.S. Cl.
CPC ......... *F16M 11/14* (2013.01); *F16M 2200/022* (2013.01); *F16M 13/02* (2013.01); *F16M 11/16* (2013.01); *F16M 11/2078* (2013.01); *B60R 2011/0059* (2013.01); *B60R 2011/0012* (2013.01); *B60R 11/0252* (2013.01)
USPC ................ 248/122.1; 248/188.91; 248/188.5; 248/188.1

(58) Field of Classification Search
USPC .......... 248/188.6, 188.8, 188.7, 188.5, 188.1, 248/122.1, 124.1, 220.21, 229.1, 284.1, 248/917–923; 297/188.01, 188.02, 188.2, 297/188.04, 188.05, 188.06, 188.08, 297/188.12, 188.14, 188.21
See application file for complete search history.

(56) References Cited

U.S. PATENT DOCUMENTS

| | | | | | |
|---|---|---|---|---|---|
| 1,306,211 | A | * | 6/1919 | Baron et al. | 297/188.2 |
| 2,954,955 | A | * | 10/1960 | Feller | 248/231.41 |
| 3,107,941 | A | * | 10/1963 | Davies | 297/170 |
| 3,338,629 | A | * | 8/1967 | Drees | 312/235.8 |
| 3,608,852 | A | * | 9/1971 | Horn | 248/166 |
| 3,922,973 | A | * | 12/1975 | Sturgeon | 108/26 |
| 3,934,771 | A | * | 1/1976 | Eberhard | 224/275 |
| 4,341,418 | A | * | 7/1982 | Chappell | 297/144 |
| 4,946,120 | A | * | 8/1990 | Hatcher | 248/183.2 |
| 5,294,026 | A | * | 3/1994 | McGirt | 224/549 |
| 5,628,439 | A | * | 5/1997 | O'Hara | 224/275 |
| 5,667,272 | A | * | 9/1997 | Sutton | 297/140 |
| 5,813,354 | A | * | 9/1998 | Scott | 108/44 |
| 5,957,419 | A | * | 9/1999 | Lancaster et al. | 248/188.1 |
| 5,973,917 | A | * | 10/1999 | White | 312/223.2 |
| 5,996,507 | A | * | 12/1999 | Joseph | 108/46 |
| 6,135,549 | A | * | 10/2000 | Demick et al. | 297/188.1 |
| 6,386,413 | B1 | * | 5/2002 | Twyford | 224/553 |
| 6,439,443 | B1 | * | 8/2002 | Liao | 224/275 |
| 7,233,487 | B2 | * | 6/2007 | Stinson | 361/679.55 |
| 7,611,112 | B2 | * | 11/2009 | Lin | 248/274.1 |
| 7,869,192 | B2 | * | 1/2011 | Jacobsen et al. | 361/605 |
| 2002/0195528 | A1 | * | 12/2002 | Overbeck | 248/188.6 |
| 2008/0135697 | A1 | * | 6/2008 | Workman et al. | 248/177.1 |
| 2010/0223832 | A1 | * | 9/2010 | Lombardi | 42/94 |

* cited by examiner

*Primary Examiner* — Nkeisha Smith
(74) *Attorney, Agent, or Firm* — Charles J. Rupnick

(57) ABSTRACT

A vehicle seat mount is formed of a support hub adapted for securing a platform thereto, a stabilizer coupled for securing the support hub against rocking on a seat rest portion of the vehicle seat, a rear retaining element projected from the hub and adapted for engaging the vehicle seat between the seat rest portion and a backrest portion thereof, and a forward retaining element adapted for engaging a front portion of the seat rest portion of the vehicle seat.

20 Claims, 14 Drawing Sheets

VEHICLE SEAT MOUNT

FIELD OF THE INVENTION

The present invention relates generally to a device for mounting an object to a passenger seat of a motor vehicle, and in particular to a mounting device coupleable to the seat rest of the passenger seat.

BACKGROUND OF THE INVENTION

Mobile offices are now common. However, known devices for mounting objects to a seat of a motor vehicle are generally anchored into position using standard seat belt arrangements. Furthermore, the existing devices depend on full insertion and latching of the seat belt arrangement. This can be a cumbersome task and there is a danger that insertion and latching of the seat belt may be imperfectly formed. Furthermore, known devices also do not offer a mounting solution that is easily compactable for mobility.

SUMMARY OF THE INVENTION

The present invention is a novel vehicle seat mount for your laptop or tablet computer.

According to one aspect of the invention the novel vehicle seat mount is formed of a support hub adapted for resting on a sitting surface of a seat rest portion of the vehicle seat, the support being adapted for securing the object thereto. A collapsible stabilizer is coupled to the support hub and is expandable for engaging the sitting surface of the vehicle seat rest portion. The collapsible stabilizer includes a pair of side stabilizer legs for securing the support hub against yawing vehicle seat rest portion, and a pair of fore and aft pitch stabilizer legs adapted for securing the support hub against pitching on the vehicle seat rest portion. The fore pitch stabilizer leg has an end portion thereof distal from the support hub and extended adjacent to a front portion of the seat rest portion of the vehicle seat. The aft pitch stabilizer leg has an end portion thereof distal from the support hub and extendible for engaging the vehicle seat between the seat rest portion thereof and a backrest portion thereof. A forward anchor element is coupled to the distal end of the fore pitch stabilizer leg and adapted for engaging an underneath portion of the seat rest portion of the vehicle seat adjacent to the front portion thereof. A rear anchor element is coupled to the distal end of the aft pitch stabilizer leg and adapted for engaging a rear portion of the seat rest portion of the vehicle seat adjacent to the backrest portion thereof.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 1:
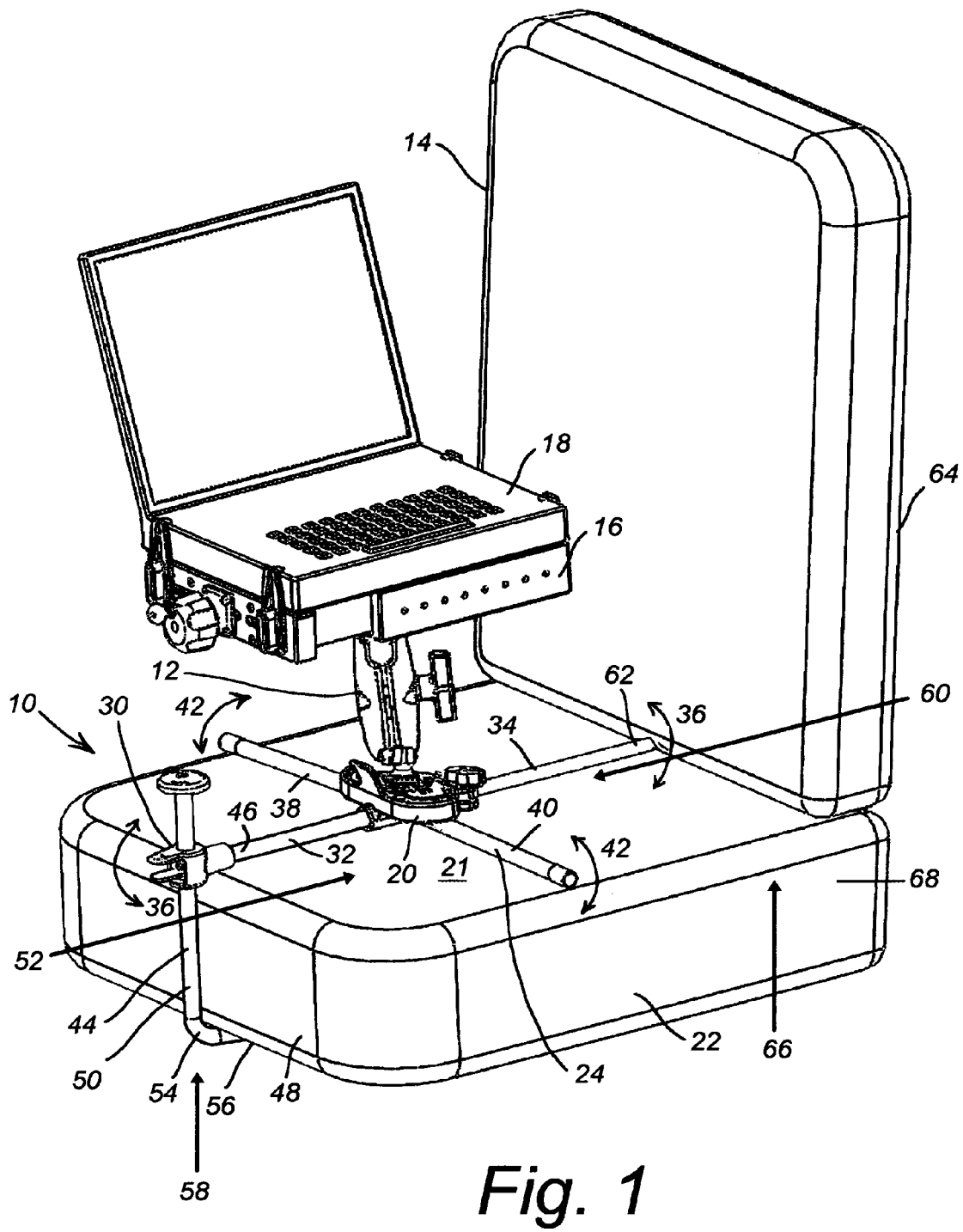
FIG. 1 illustrates a novel vehicle seat mount installed on a vehicle seat.

FIG. 1 illustrates one example of a novel vehicle seat mount 10 installed in a vehicle for mounting an object 12 to a vehicle seat 14. Object 12 may be, for example, an adjustable support holding a tray 16 for a laptop or tablet computer 18. Seat mount 10 includes a support hub 20 for resting approximately centered on a sitting surface 21 of seat rest portion 22 of vehicle seat 14, support 20 being adapted for securing object 12 thereto. A stabilizer 24 is coupled for securing support 20 against rocking on seat rest portion 22. For example, stabilizer 24 includes a pair of fore and aft pitch stabilizer legs 32 and 34 to secure support 20 against pitching (arrows 36) on the seat rest 22, and a pair of side stabilizer legs 38 and 40 to secure support 20 against yaw or sideways rocking (arrows 42).

A forward seat engaging member or anchor 44 is coupled to end 46 of fore pitch stabilizer leg 32 distal from support 20 for engaging a front portion 48 of seat rest portion 22 of vehicle seat 14. Forward anchor 44 includes a clamp mechanism 30 controlling an extendable arm portion 50 that is retractably extendable downwardly across front portion 48 of vehicle seat rest 22 for securing support 20 against sliding rearwardly (arrow 52) on seat rest 22. A jaw portion 54 of extendable arm 50 extends beneath seat rest portion 22 and engages an underneath portion 56 thereof for securing support 20 against lifting (arrow 58) away from sitting surface 21. Optionally, jaw portion 54 is further structured to grasp underneath portion 56 of vehicle seat rest portion 22 for securing support 20 against disengagement from seat rest 22. Jaw portion 54 also may operate to secure support 20 against sliding forwardly (arrow 60) on seat rest 22.

An end 62 of aft pitch stabilizer leg 34 distal from support 20 is extended rearwardly from support 20 sufficiently for engaging vehicle seat 14 between seat rest 22 and a backrest portion 64 thereof. Aft pitch stabilizer leg 34 thereby secures support 20 against lifting (arrow 66) away from a rear portion 68 of seat rest 22.

Figure 2:
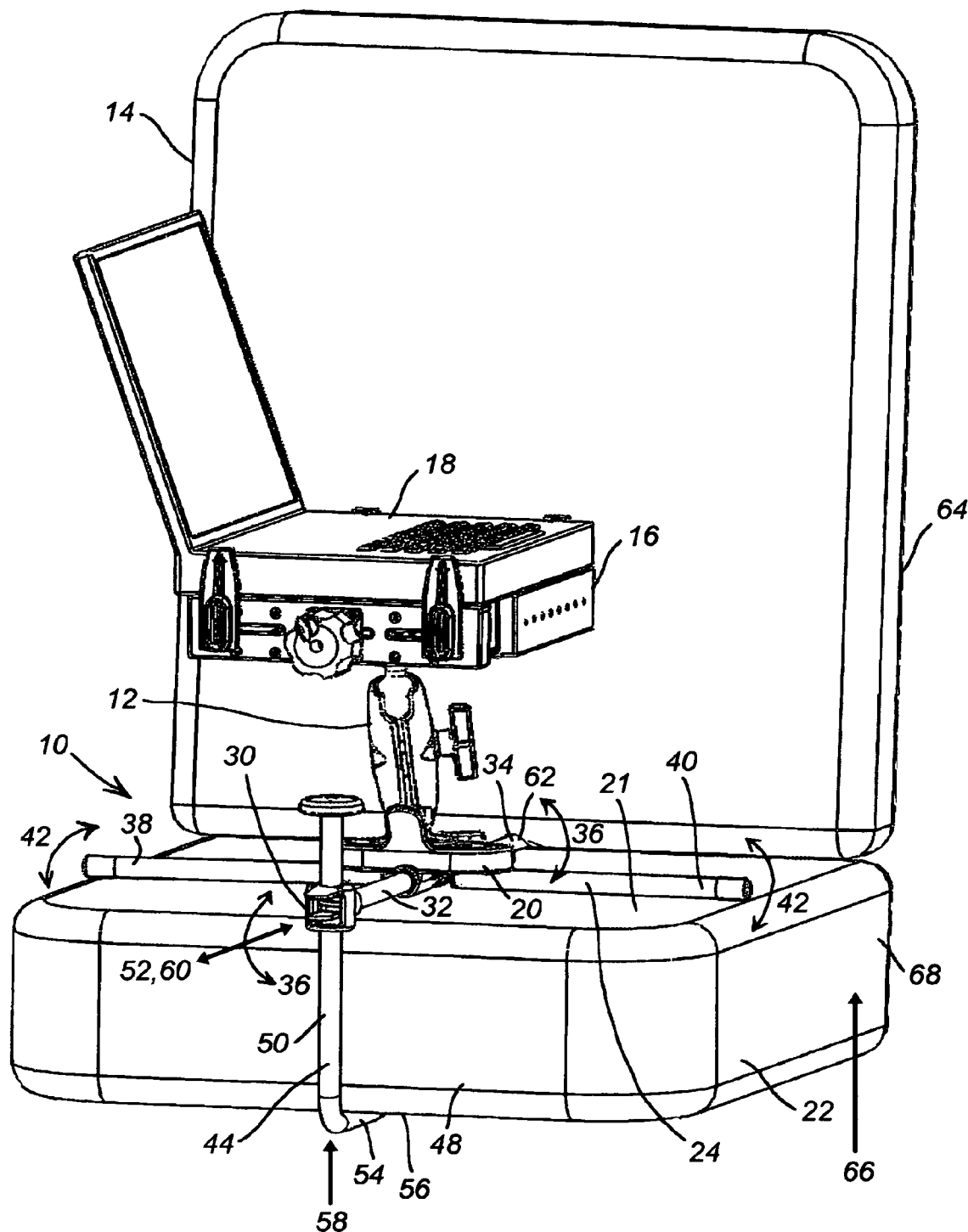
FIG. 2 is another exemplary view of the novel seat mount.

FIG. 2 is another exemplary view of novel vehicle seat mount 10.

Figure 3:
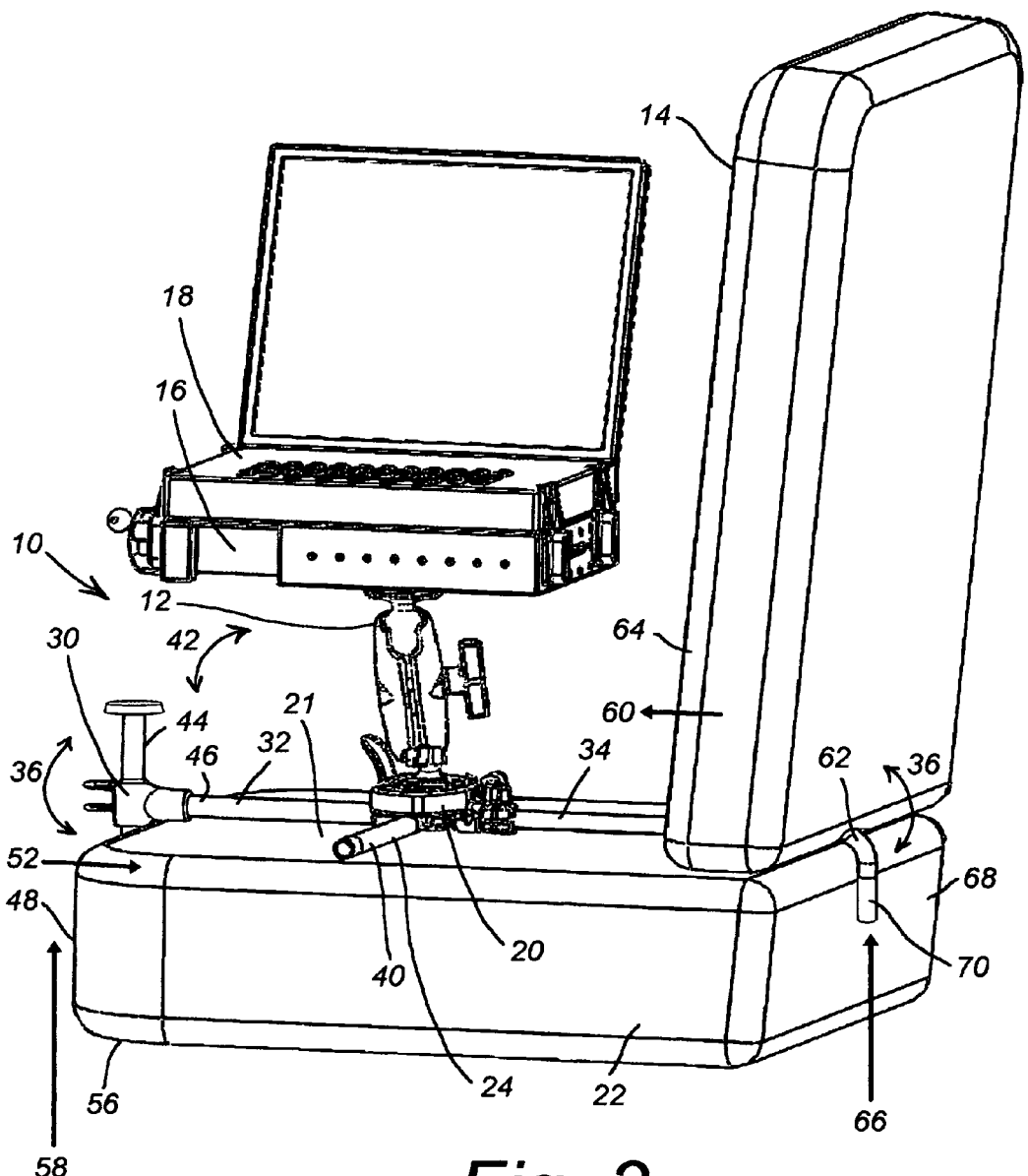
FIG. 3 is a back view of a vehicle seat that illustrates the novel seat mount.

FIG. 3 illustrates exemplary vehicle seat mount 10 as viewed from behind vehicle seat 14. Here, an aft seat engaging member or anchor 70 is coupled to distal end 62 of aft pitch stabilizer leg 34 for grasping rear portion 68 of seat rest 22 for securing support 20 against sliding forwardly (arrow 60) on seat rest 22.

Figure 4:
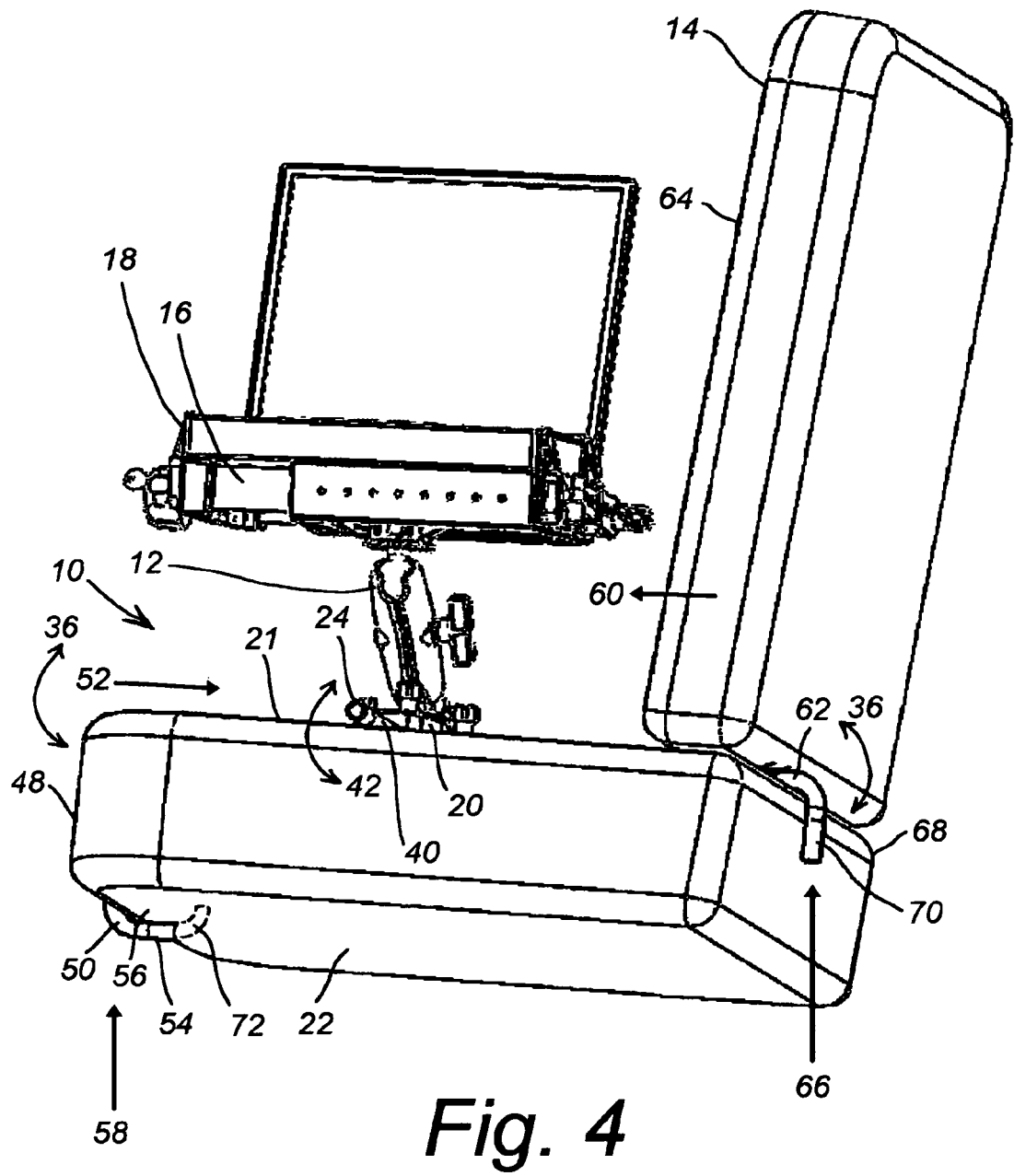
FIG. 4 is a underneath view of a vehicle seat that illustrates the novel seat mount.

FIG. 4 illustrates exemplary vehicle seat mount 10 as viewed from underneath vehicle seat 14. Jaw portion 54 of forward anchor 44 is shown extended beneath seat rest portion 22 and engaging an underneath portion 56 thereof for securing support 20 against lifting (arrow 58) away from front portion 48 of seat rest 22. As illustrated here, the tip of jaw portion 54 optionally includes a catch portion 72 (shown in phantom) for engaging underneath portion 56 of seat rest 22 and securing jaw portion 54 against rotating out of engagement with seat rest 22.

Figure 5:
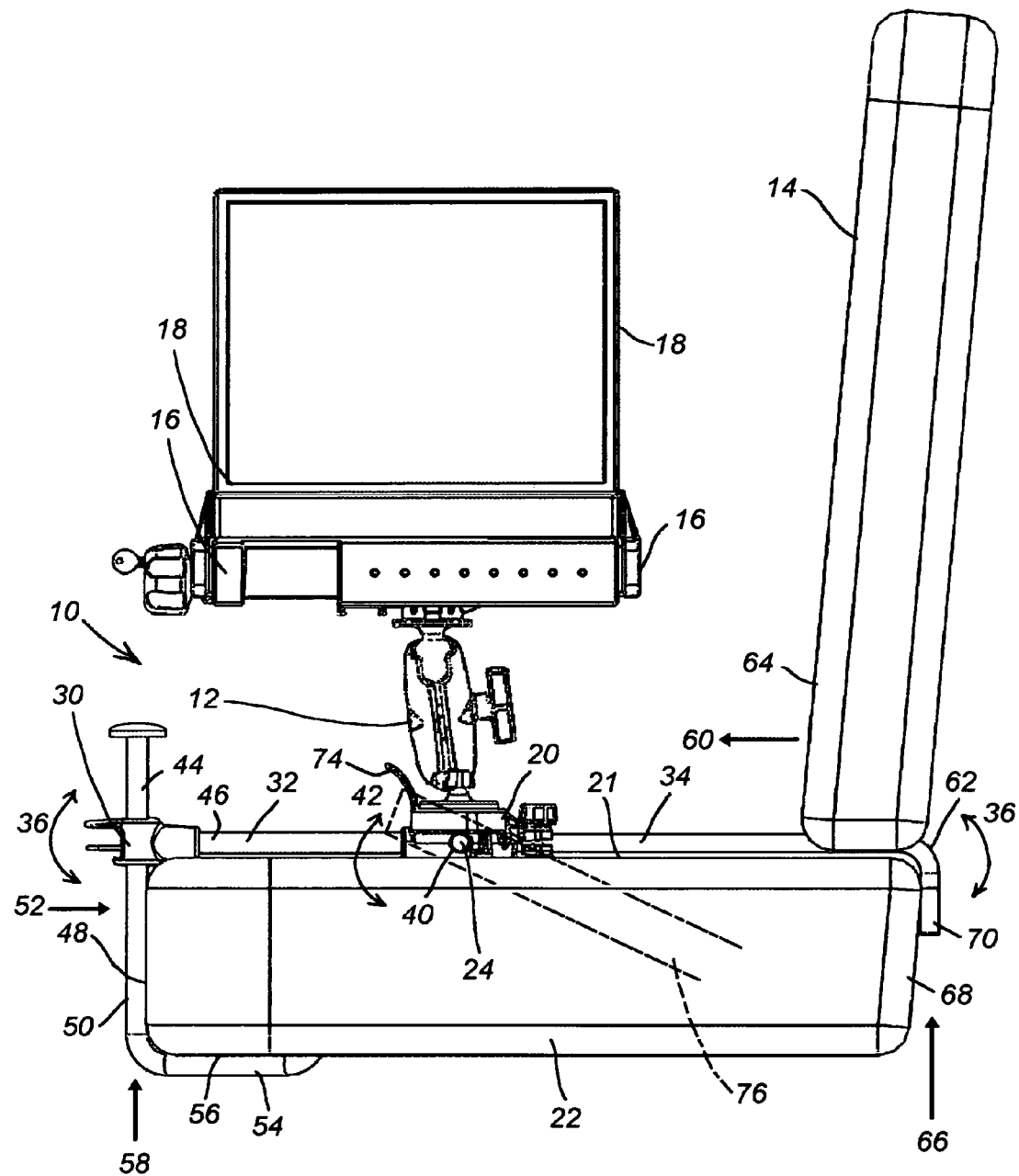
FIG. 5 is a side view of a vehicle seat that illustrates the novel seat mount.

FIG. 5 is a side view of vehicle seat 14 that illustrates vehicle seat mount 10. Here, support 20 further includes an optional restraint engagement member 74 for engaging vehicle safety belt 76 (phantom). Optional restraint engagement member 74, when present, is adapted to releasably engage at least a portion of vehicle seat belt 76 to limit horizontal sliding forwardly (arrow 60) on seat rest 22. For example, optional restraint engagement member 74 is saddle horn-shaped for receiving safety belt 76 and retaining it relative to support 20.

Additionally, as illustrated, when used with vehicle seat mount 10, vehicle seat belt 76 also engages a portion of one or both of support 20 and pitch stabilizer leg 32 for limiting pitching (arrows 36) or vertical lifting (arrow 58) away from front portion 48 of seat rest 22.

As will be readily understood, vehicle seat belt 76 is not necessary for retaining support 20 in a stable position on seat rest 22. Rather, forward and aft seat engaging members or anchors 44, 70 coupled to distal ends 46, 62 of fore and aft pitch stabilizer legs 32, 34, respectively, are effective for grasping respective front and rear portions 48, 68 of seat rest 22 for securing support 20 against sliding rearwardly (arrow 52) or forwardly (arrow 60) on seat rest 22, without the engagement of vehicle seat belt 76 with optional restraint engagement member 74. Furthermore, jaw portion 54 of forward anchor 44 also extends beneath seat rest portion 22 and engages an underneath portion 56 thereof for securing support 20 against lifting (arrow 58) away from front portion 48 of seat rest 22 without the engagement of vehicle seat belt 76 with optional restraint engagement member 74. Therefore, restraint engagement member 74 is optional and engagement therewith of vehicle seat belt 76 is redundant and wholly unnecessary.

Figure 6:
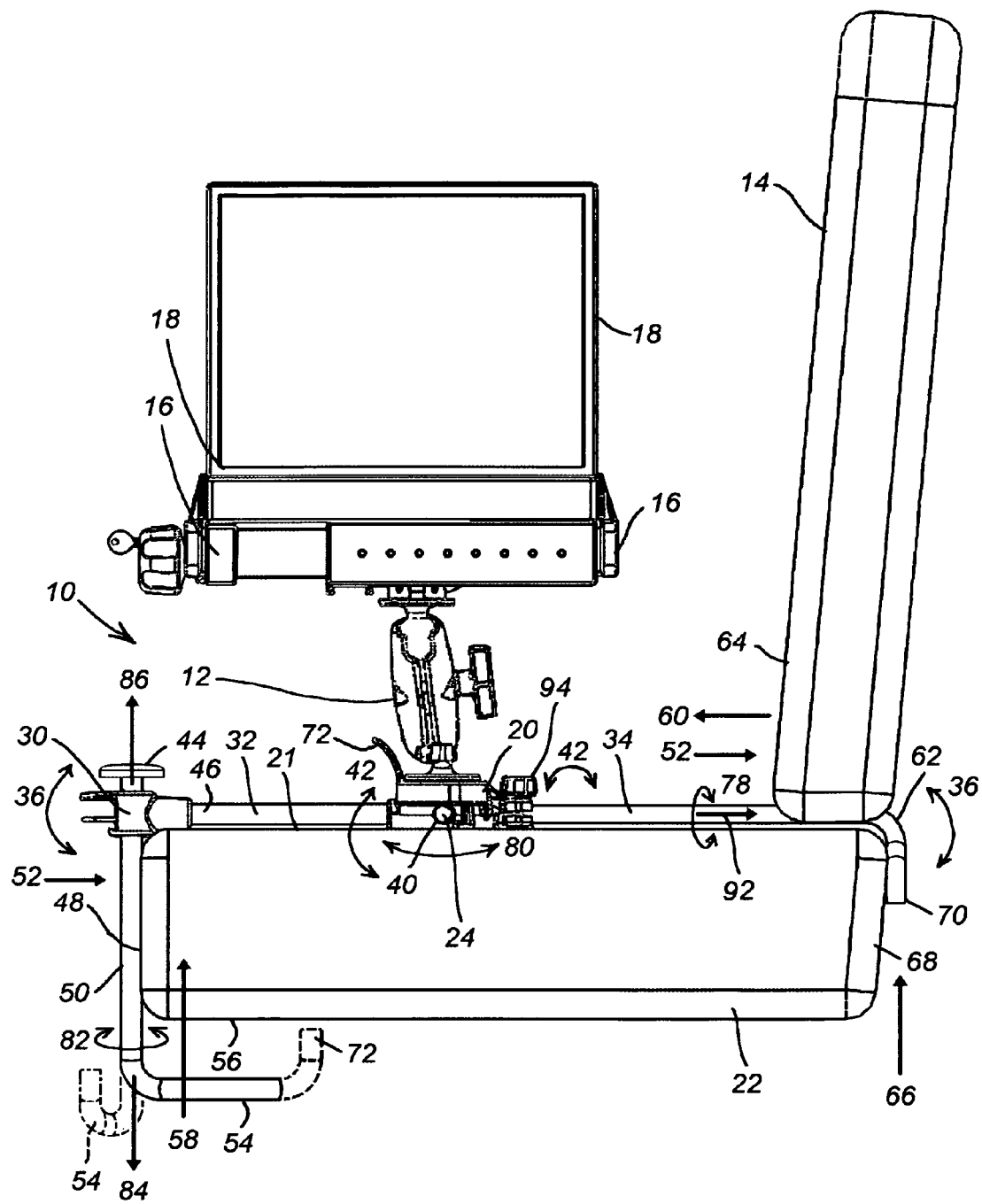
FIG. 6 illustrates operation of a forward anchor portion of the novel seat mount.

FIG. 6 illustrates operation of forward anchor 44. During installation of seat mount 10 on vehicle seat 14, end 62 of aft pitch stabilizer leg 34 is extended (arrow 92) from support 20 and rotated (arrow 78) by means disclosed herein until anchor 70 is approximately parallel with sitting surface 21 of seat rest 22. Aft anchor 70 is then pushed between seat rest 22 and backrest portion 64 of vehicle seat 14. Aft pitch stabilizer leg 34 is again rotated (arrow 78) until aft anchor 70 is seated against rear portion 68 of seat rest 22 for securing against forward sliding (arrow 60). End 62 of aft pitch stabilizer leg 34 is positioned between seat rest 22 and backrest portion 64 for securing against lifting (arrow 66). An optional clamp mechanism 94 is operated for securing aft pitch stabilizer leg 34 in this deployed state.

Side stabilizer legs 38, 40 are deployed, e.g., rotated outwardly (arrows 80), sideways of support 20, and support 20 is seated approximately centered on sitting surface 21 of seat rest portion 22 with side stabilizer legs 38, 40 spread outwardly thereof and forward anchor 44 positioned in front of front portion 48 of seat rest portion 22. Extendable arm portion 50 is positioned adjacent to front portion 48 with jaw portion 54 (phantom) rotated (arrow 82) outwardly thereof.

Clamp mechanism 30 of forward anchor 44 is operated for extending extendable arm portion 50 downwardly (arrow 84) across front portion 48 of vehicle seat rest 22 until jaw portion 54 clears underneath portion 56 of seat rest 22. Then, extendable arm portion 50 is rotated (arrow 82) for rotating disengaged jaw portion 54 from a position (phantom) adjacent to seat rest front portion 48 to a position under seat rest 22 for engaging underneath portion 56 thereof. Clamp mechanism 30 is then operated to permit extendable arm portion 50 to be lifted or pulled upwardly (arrow 86) until jaw portion 54 engages underneath portion 56 of seat rest 22.

While jaw portion 54 is engaged with underneath portion 56 of seat rest 22, forward anchor 44 secures support 20 against lifting (arrow 58) away from front portion 48 of seat rest 22. Forward anchor 44 thus also secures support 20 against pitching (arrows 36) on the seat rest 22. Additionally, catch portion 72 at tip of jaw portion 54 is engaged with underneath portion 56 of seat rest 22 and secures jaw portion 54 against rotating (arrow 82) out of engagement with seat rest 22. Engagement of forward anchor 44 with underneath portion 56 of seat rest 22 in combination with engagement of aft end 62 of aft pitch stabilizer leg 34 between seat rest 22 and backrest portion 64 secures support 20 against pitching (arrows 36).

During removal of seat mount 10, clamp mechanism 30 of forward anchor 44 is operated for extending extendable arm portion 50 downwardly (arrow 84) across front portion 48 of vehicle seat rest 22 for disengaging jaw portion 54 and catch portion 72 at tip thereof from underneath portion 56 of seat rest portion 22. Thereafter, extendable arm portion 50 is rotated (arrow 82) for rotating disengaged jaw portion 54 from a position under seat rest 22 for engaging underneath portion 56 thereof, to a position (phantom) adjacent to front portion 48 of seat rest 22 for seat mount 10 being removed from seat rest 22.

Figure 7:
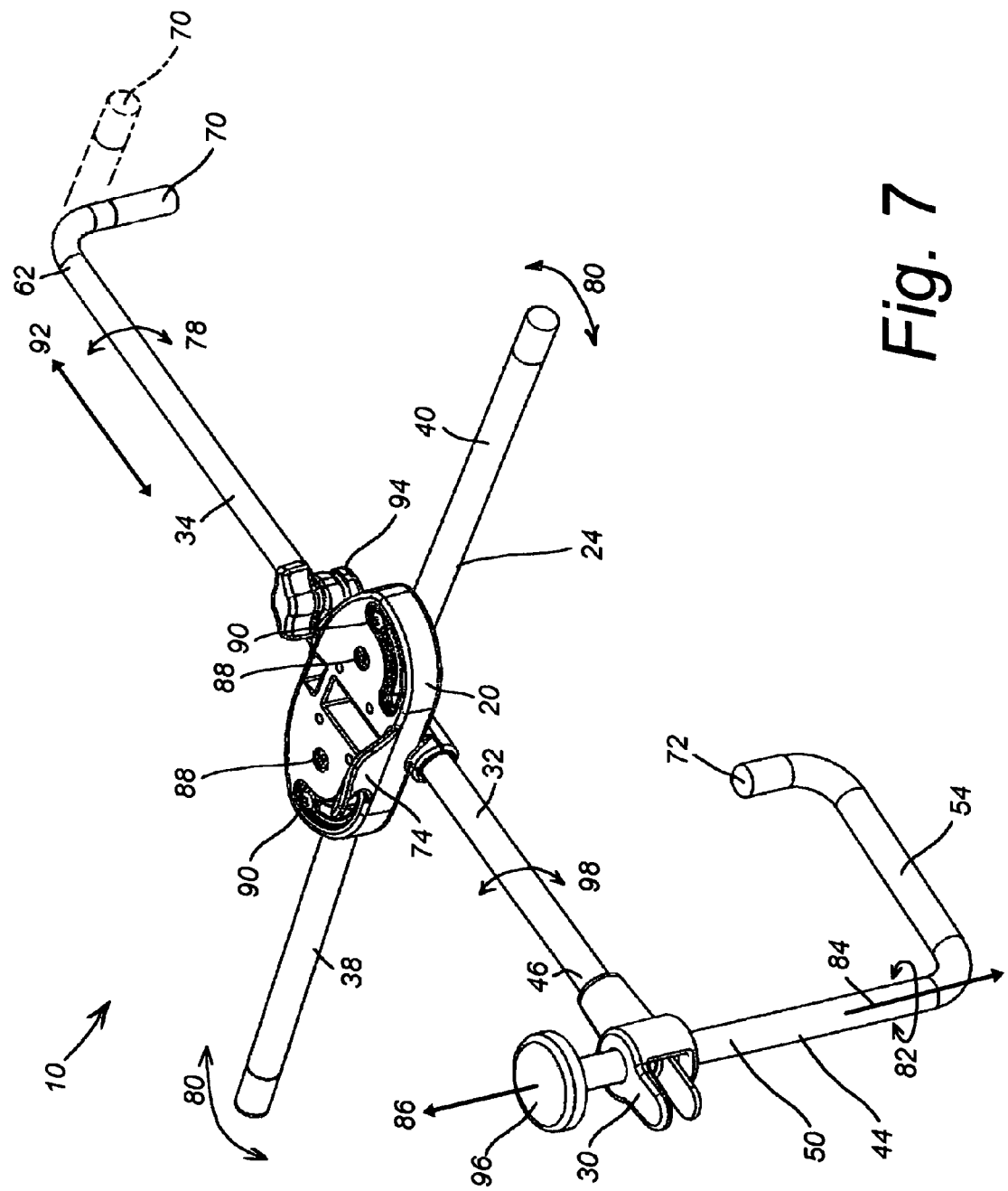
FIG. 7 is an exemplary illustration of the novel seat mount.

FIG. 7 is an exemplary illustration of seat mount 10. Side stabilizer legs 38, 40 are deployed sideways of support 20 into respective deployed positions (shown), for example, by rotation outwardly (arrows 80) about respective pivot members 88. Respective rotation control mechanisms 90 limit range of rotation of side stabilizer legs 38, 40 relative to support 20. Rotation controls 90 also permit retraction of side stabilizer legs 38, 40 from the deployed position into a storage position adjacent to fore pitch stabilizer leg 32. See, e.g., FIG. 14.

End 62 of aft pitch stabilizer leg 34 is extendable (arrow 92) from hub support 20. For example, aft pitch stabilizer leg 34 is telescopically coupled into fore pitch stabilizer leg 32. Clamp mechanism 94 is adapted for retaining aft stabilizer leg 34 in the extended state. As disclosed here, end 62 of aft pitch stabilizer leg 34 is rotatable (arrow 78) relative to support 20 for rotating anchor 70 between an insertion orientation (phantom) approximately parallel with side legs 38, 40 to an operative anchoring orientation approximately perpendicular to side legs 38, 40 and sitting surface 21 of seat rest 22. Tightened clamp mechanism 94 further retains anchor 70 in the deployed or operative anchoring state.

Forward anchor 44 at distal end 46 of fore pitch stabilizer leg 32 includes a handle 96 on extendable arm 50 that is useful for pulling jaw portion 54 downwardly (arrow 58) into position for being inserted under seat rest 22. See, e.g., FIG. 6. Handle 96 is further useful for pulling jaw portion 54 upwardly (arrow 86) for engaging underneath portion 56 of seat rest 22. For example, clamp mechanism 30 is released to move jaw portion 54 relative to end 46 of stabilizer leg 32. Clamp mechanism 30 retains jaw portion 54 in its engaged position, e.g., by squeezing or jamming extendable arm 50. As disclosed herein, jaw portion 54 is rotatable (arrow 82) between engaging and disengaging positions relative to seat rest 22. Extendable arm 50 is also rotatable (arrow 98) relative to hub support 20 for moving between a storage orientation approximately parallel with side legs 38, 40 and an operative anchoring orientation approximately perpendicular to side legs 38, 40 and sitting surface 21 of seat rest 22.

Figure 8:
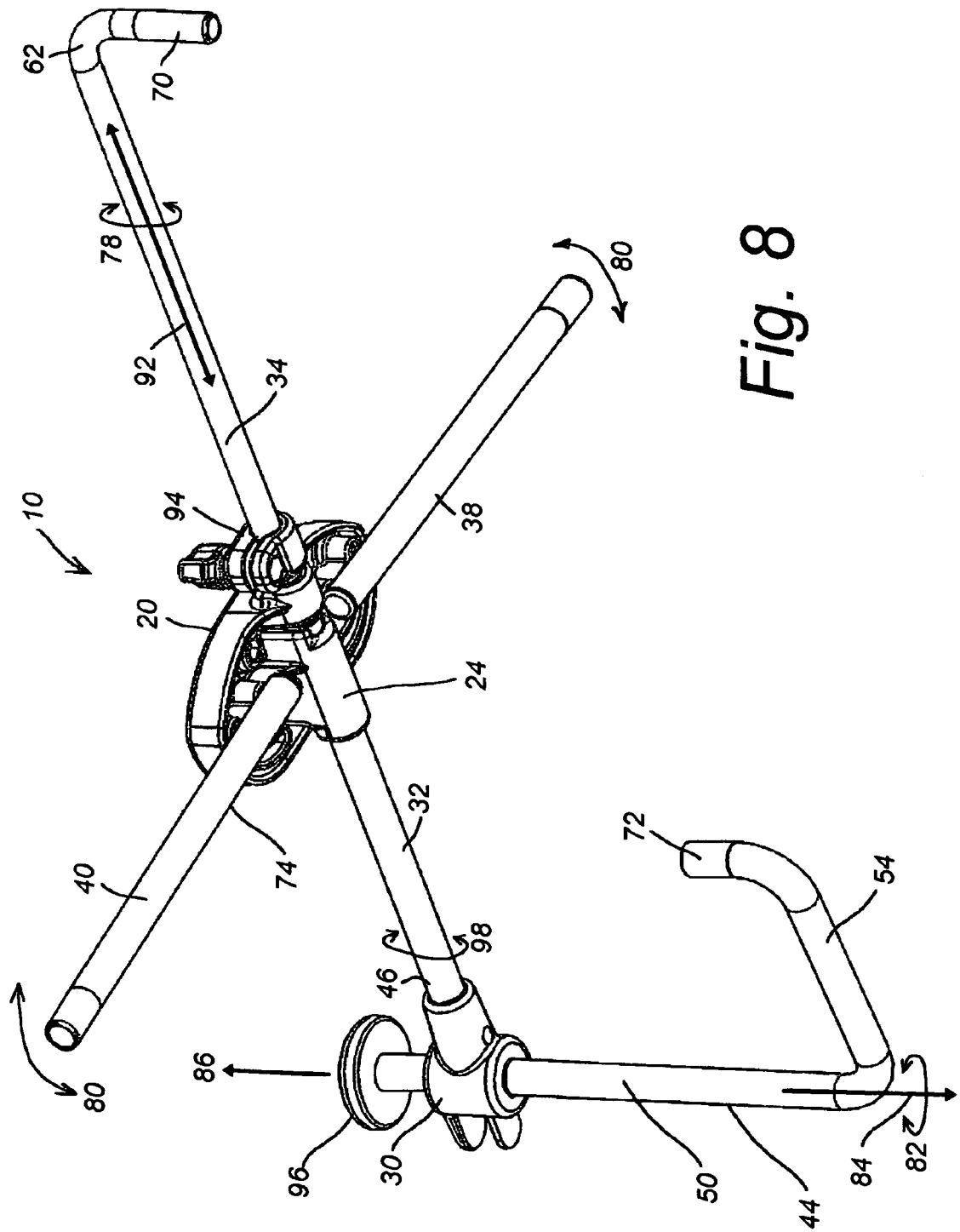
FIG. 8 shows exemplary of the novel seat mount as viewed from a vehicle seat rest.

FIG. 8 shows exemplary seat mount 10 as viewed from seat rest 22.

Figure 9:
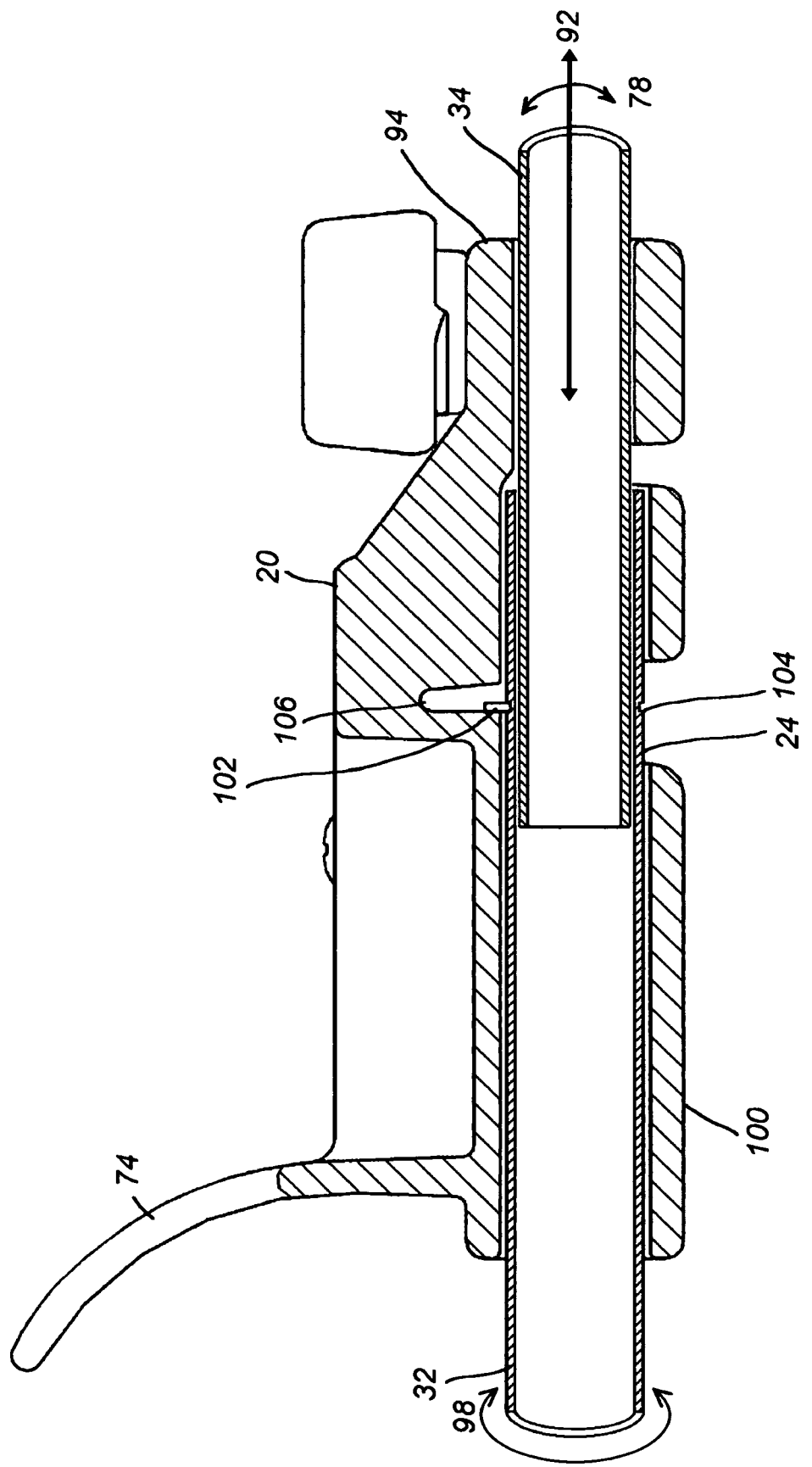
FIG. 9 is an exemplary illustration of a central support hub of the novel seat mount.

FIG. 9 is an exemplary illustration of central support hub 20 of seat mount 10. For example, fore and aft pitch stabilizer legs 32, 34 are round tubular members with aft pitch stabilizer leg 34 being telescopically slideable (arrow 92) within fore pitch stabilizer leg 32. Furthermore, aft pitch stabilizer leg 34 is rotatable (arrow 98) within fore pitch stabilizer leg 32 because fore and aft pitch stabilizer legs 32, 34 are round tubular members. Clamp mechanism 94 is integrated with support hub 20 and is adapted for retaining aft stabilizer leg 34 in the extended state and is also adapted for permitting aft stabilizer leg 34 to slide (arrow 92) telescopically within fore pitch stabilizer leg 32. Clamp mechanism 94 is also adapted for retaining aft stabilizer leg 34 in a retracted state with aft stabilizer leg 34 telescopically retracted within fore pitch stabilizer leg 32 with distal end 62 and anchor 70 positioned adjacent to support hub 20, as disclosed herein.

As disclosed herein, extendable arm 50 of forward anchor 44 is rotatable relative to hub support 20 for moving between a storage orientation and an operative anchoring orientation. For example, fore pitch stabilizer leg 32 is held in a tubular sheath 100 of support hub 20 that permits rotation (arrow 98) of stabilizer leg 32 for rotating extendable arm 50. Fore pitch stabilizer leg 32 is retained in sheath 100 of support hub 20 by a keeper 102, which is illustrated by example and without limitation as a snap ring fit into a mating groove 104 formed in stabilizer leg 32. Snap ring keeper 102 is positioned in a retention notch 106 formed in support hub 20 that restricts longitudinal motion of fore stabilizer leg 32, while permitting rotation (arrow 98).

Figure 10:
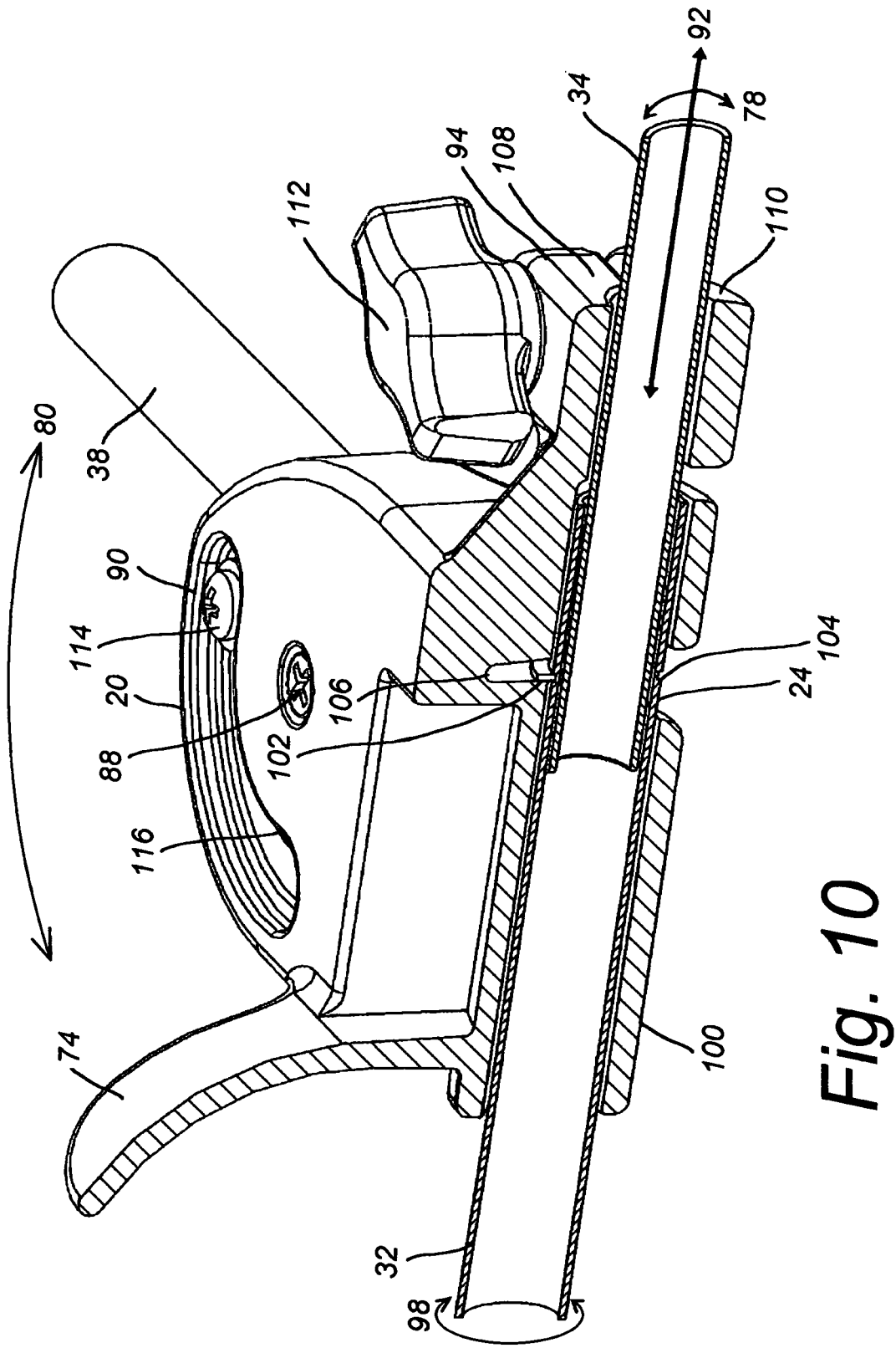
FIG. 10 is a perspective view showing an exemplary illustration of central support hub.

FIG. 10 is a perspective view showing an exemplary illustration of central support hub 20 of seat mount 10. Clamp mechanism 94 is illustrated as a squeeze clamp having a portion 108 fixed to support hub 20, and a moveable portion 110. A crank 112 is structured for moving moveable portion 110 toward fixed portion 108 for squeezing aft stabilizer leg 34 therebetween.

Rotation control mechanism 90 for limit range of rotation (arrow 80) of side stabilizer leg 40 about pivot member 88 is illustrated as a guide pin 114 operating in a part circular slot 116 formed in support hub 20 substantially concentrically about pivot 88.

Figure 11:
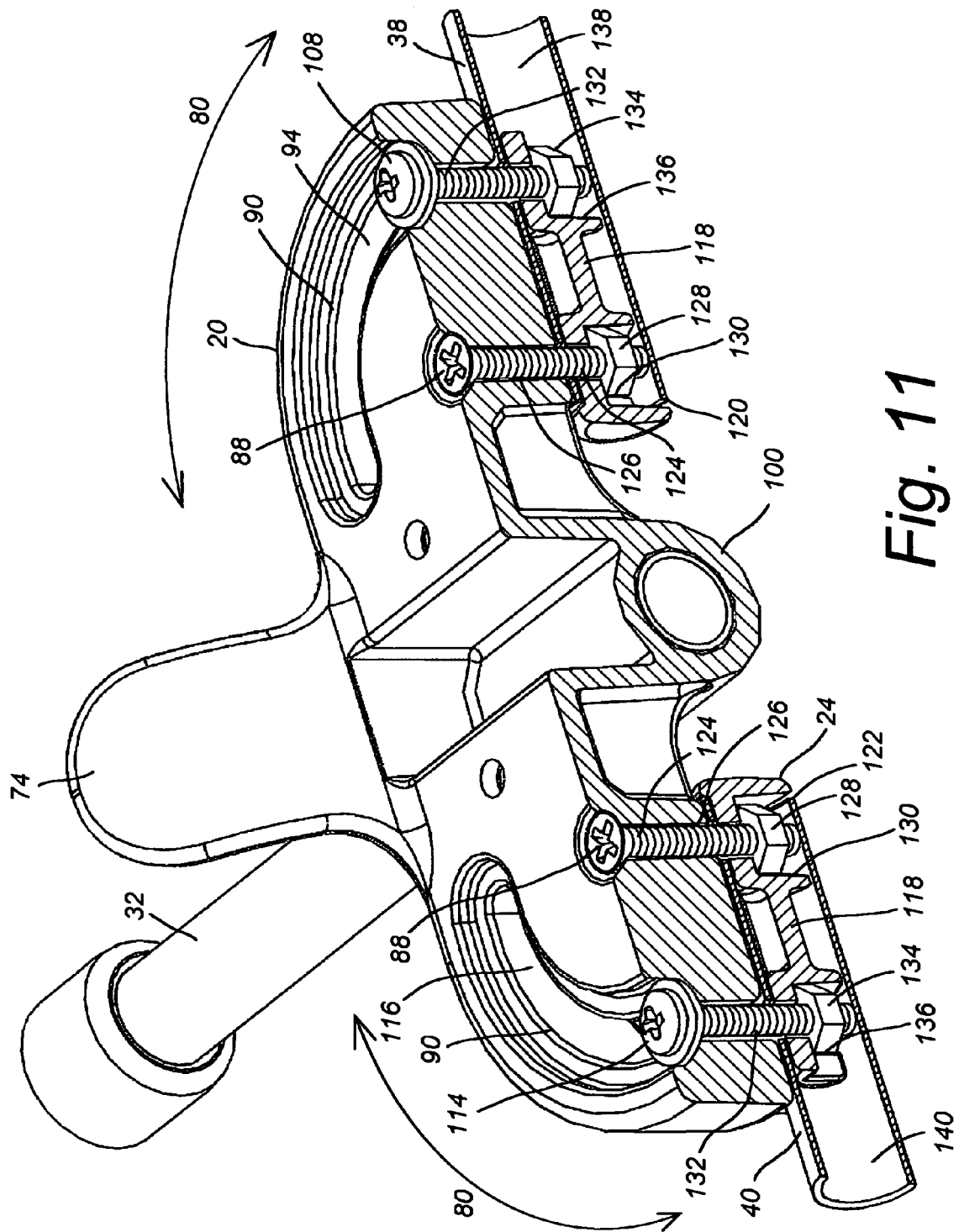
FIG. 11 is another exemplary illustration of support hub of the novel seat mount.

FIG. 11 is another exemplary illustration of central support hub 20 of seat mount 10. Side stabilizer legs 38, 40 are retained in support hub 20 by pivot members 88 coupled into molded retention plugs 118 inserted into ends 120 and 122 of respective stabilizer legs 38, 40 proximate to support hub 20. For example, pivot members 88 are screws with threaded shafts 124 inserted through clearance apertures 126 through support hub 20. Threaded shafts 124 are retained in plugs 118 by mating nuts 128 held in nut pockets 130 molded into plugs 118.

Pins 114 of rotation control mechanisms 90 are optionally screws with threaded shafts 132 inserted through part circular clearance slots 116 through support hub 20. Threaded shafts 132 are retained in plugs 118 by mating nuts 134 held in nut pockets 136 molded into plugs 118.

Plugs 118 may be a force fit inside tube ends 120, 122 of tubular stabilizer legs 38, 40 and be retained therein by compressive force. Alternatively, plugs 118 may be retained in tube ends 120, 122 by shafts 124, 132 of screw pivot members 88 and/or screw pins 114 extended through molded plugs 118 into compressive contact with interior surfaces 138, 140 of tubular stabilizer legs 38, 40.

Figure 12:
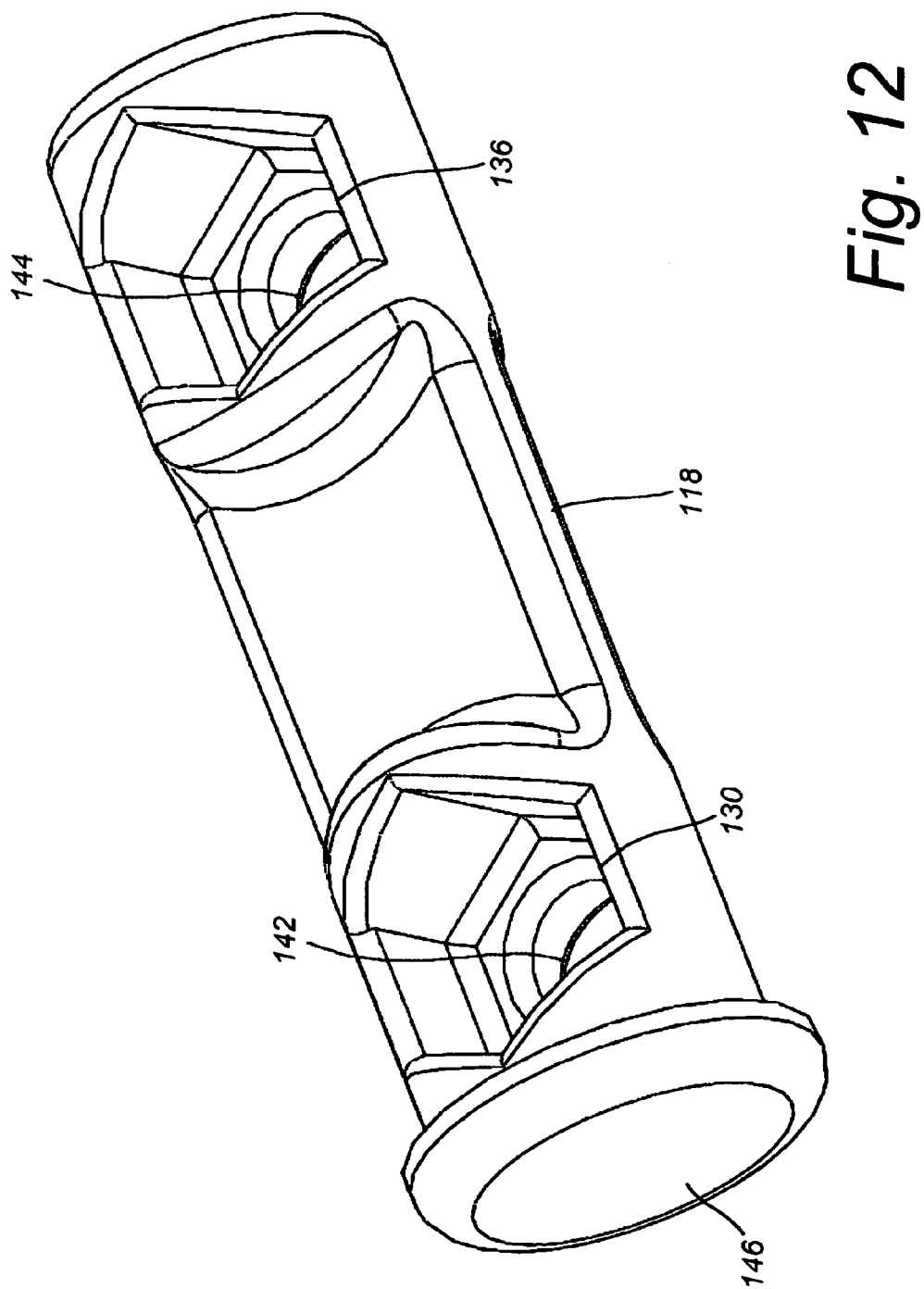
FIG. 12 is an exemplary illustration of a retention plug of the novel seat mount.

FIG. 12 is an exemplary illustration of plugs 118 being molded with a diameter to be received into tube ends 120, 122 of respective stabilizer legs 38, 40. Clearance apertures 142 and 144 are molded in plugs 118 for threaded shafts 124, 132 of screw pivot members 88 and screw pins 114, respectively. Clearance apertures 142, 144 are molded in substantially alignment with respective nut pockets 130, 136. Furthermore, plugs 118 may include end caps 146 size to operate as stops against respective stabilizer leg tube ends 120, 122 during insertion thereinto.

Figure 13:
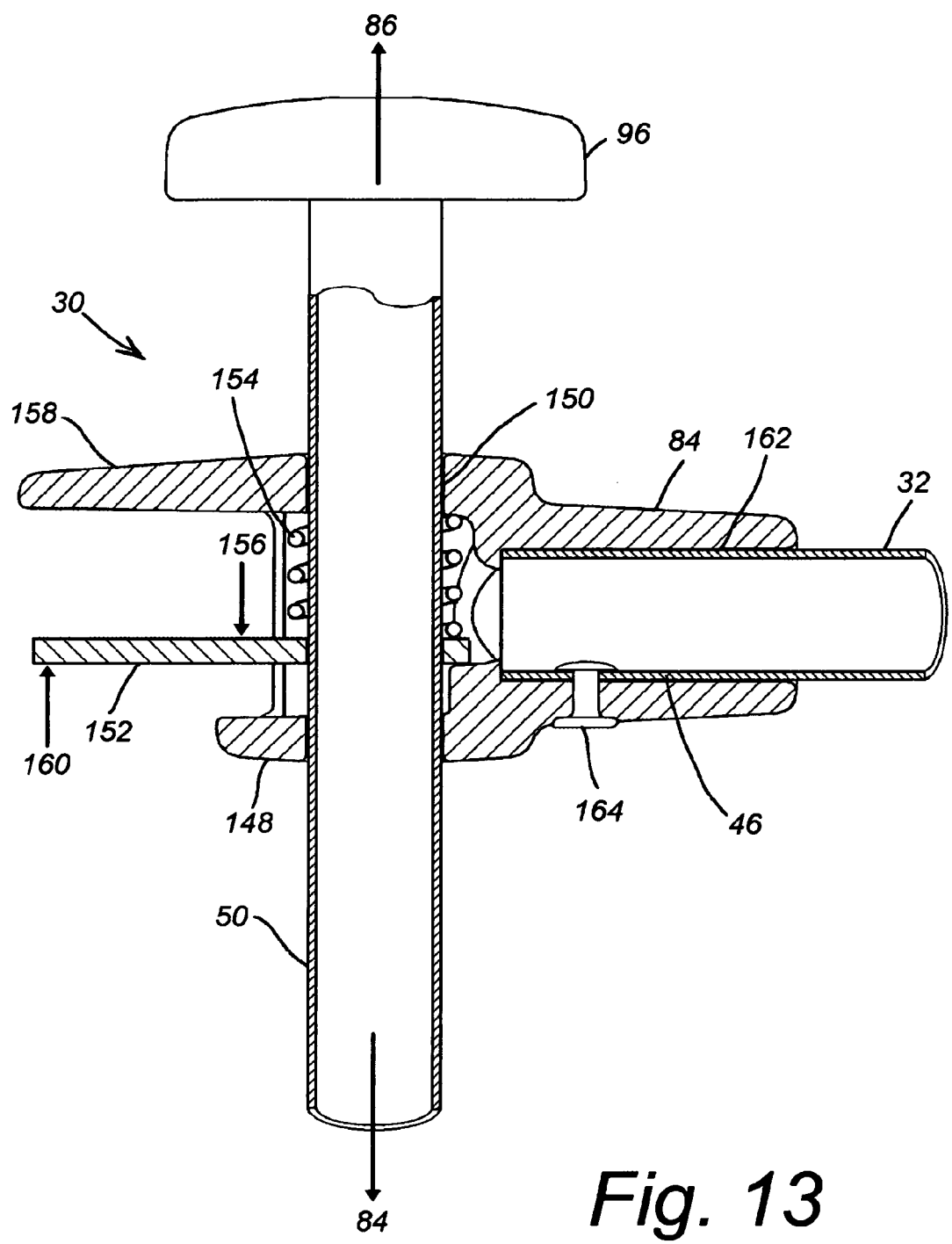
FIG. 13 is an exemplary illustration of a clamp mechanism of the novel seat mount.

FIG. 13 is an exemplary illustration of clamp mechanism 30 controlling extendable arm portion 50 of forward anchor 44. Here, clamp mechanism 30 is configured by example and without limitation as a pinch clamp having a molded anvil 148 with a clearance aperture 150 for extendable arm portion 50 to slide through both downwardly (arrow 84) and upwardly (arrow 86), as disclosed herein. Clamp 30 includes a crimping member 152 operating against a biasing member 154, e.g., a compression spring for clamping extendable arm portion 50 relative to anvil 148. Expansion force (arrow 156) of spring 154 forces crimping member 152 to interlock with arm portion 50 in a known manner. Anvil 148 includes a reaction member 158 useful for squeezing (arrow 160) crimping member 152 against expansion force (arrow 156) of spring 154 for releasing hold on arm portion 50 and allowing movement downwardly (arrow 84) and upwardly (arrow 86) through anvil clearance aperture 150.

Anvil 148 is coupled to distal end 46 of fore pitch stabilizer leg 32. For example, anvil is molded with a sheath 162 that is a slip fit over end 46 of stabilizer leg 32 and fixed in place with a fastener 164.

Figure 14:
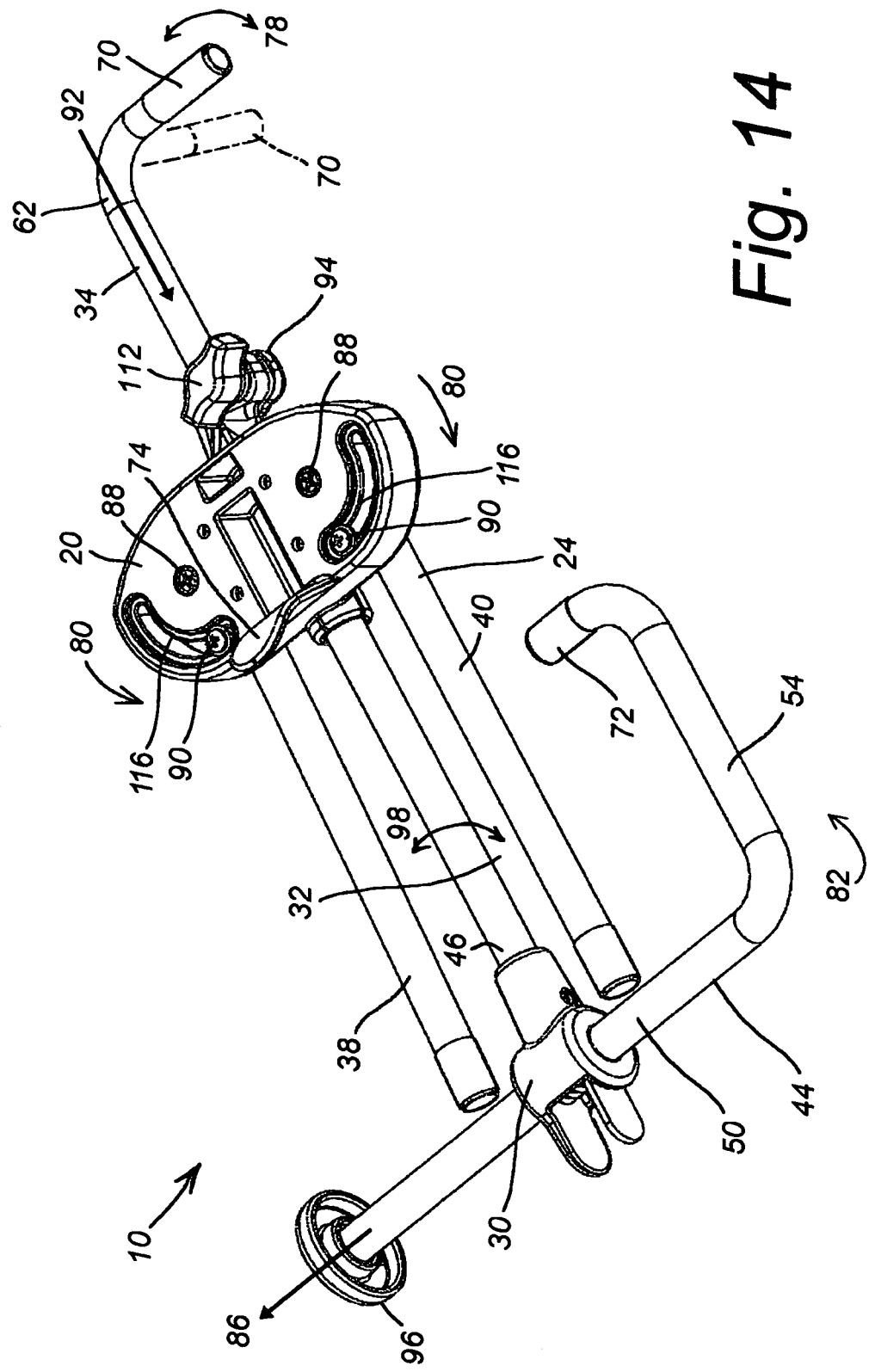
FIG. 14 is an exemplary illustration of the novel vehicle seat mount being folded into a substantially flat storage configuration for easy mobility.

FIG. 14 is an exemplary illustration of seat mount 10 being folded into a substantially flat storage configuration for easy mobility. For example, when folded flat, seat mount 10 can be fit into a suitcase or briefcase for travel. For example, entire stabilizer 24 is collapsible. Here, clamp mechanism 94 is loosened for permitting aft stabilizer leg 34 to rotate (arrow 78) anchor 70 from the operative anchoring orientation (phantom) to the insertion orientation, and for telescopically retracting (arrow 92) aft pitch stabilizer leg 34 into fore pitch stabilizer leg 32 and positioning anchor 70 adjacent to support hub 20. Clamp mechanism 94 is then tightened for retaining aft pitch stabilizer leg 34 and anchor 70 in the compacted state.

Side stabilizer legs 38, 40 are retracted, e.g., rotated inwardly and forwardly (arrows 80) of support hub 20 into respective retracted positions on either side of fore pitch stabilizer leg 32.

Clamp mechanism 30 of forward anchor 44 is loosened for rotating (arrow 82) jaw portion 54 of extendable arm portion 50 inwardly (arrow 82) of support hub 20. Loosened clamp mechanism 30 also permits arm portion 50 to be retracted (arrow 86) at least partially along end 46 of fore pitch stabilizer leg 32. Tightened clamp 30 retains arm portion 50 in the retracted position. Extendable arm 50 is then rotated (arrow 98) relative to hub support 20 into the storage orientation approximately parallel with side legs 38, 40, e.g., by rotating fore pitch stabilizer leg 32 in sheath 100 of support hub 20.

Seat mount 10 is thus configured in a substantially flat compact configuration for storage or easy mobility.

While the preferred and additional alternative embodiments of the invention have been illustrated and described, it will be appreciated that various changes can be made therein without departing from the spirit and scope of the invention.

Therefore, it will be appreciated that various changes can be made therein without departing from the spirit and scope of the invention. Accordingly, the inventor makes the following claims.

What is claimed is:

1. A device for mounting an object to a vehicle seat, the device comprising:
   a support hub adapted for securing a platform thereto, the support hub further comprising at least one collapsible stabilizer member;
   a rear retaining element projected from the hub and adapted for engaging the vehicle seat between the seat rest portion and a backrest portion thereof; and
   a forward retaining element adapted for engaging a front portion of the seat rest portion of the vehicle seat, the forward retaining element further comprising a reentrant jaw portion adapted for engaging an underneath portion of the seat rest portion.

2. The mount of claim 1, wherein the rear retaining element further comprises telescopically adjustable leg.

3. The mount of claim 2, wherein the rear retaining element further comprises an anchor element distal from the support hub.

4. The mount of claim 3, wherein the anchor element is further rotatable relative to the support hub.

5. The mount of claim 1, wherein the forward retaining element further comprises an extensible leg portion comprising the jaw portion adjacent to one end thereof and being retractably extendable for engaging the jaw portion with the underneath portion of the seat rest portion of the vehicle seat.

6. The mount of claim 5, wherein the jaw portion of the forward retaining element further comprises a catch portion distal from the extensible leg portion.

7. The mount of claim 5, wherein the jaw portion is further moveable for engaging with the underneath portion of the seat rest portion of the vehicle seat.

8. The mount of claim 1, further comprising a plurality of collapsible stabilizer legs.

9. A device for mounting an object to a vehicle seat, the device comprising:
   a support hub for supporting the object on a seat rest portion of the vehicle seat;
   a collapsible stabilizer coupled to the support hub against rocking on the seat rest portion of the vehicle seat; and
   a securing means for securing the support to the vehicle seat, the securing means comprising:
      an aft seat engaging member adapted for extending between the seat rest portion and a backrest portion of the vehicle seat and engaging a rear portion thereof and securing thereto, and
      a forward seat engaging member adapted for engaging a front portion of the seat rest portion of the vehicle seat and securing thereto, the forward seat engaging member further comprising a jaw portion for engaging an underneath portion of the seat rest portion of the vehicle seat.

10. The mount of claim 9, wherein the aft seat engaging member further comprises a telescopically adjustable leg.

11. The mount of claim 10, wherein the telescopically adjustable leg further comprises an anchor member distal from the support hub and adapted for engaging the rear portion of the seat rest portion of the vehicle seat.

12. The mount of claim 11, wherein the anchor member of the telescopically adjustable leg is further rotatable relative to the support hub.

13. The mount of claim 9, wherein the jaw portion of the forward seat engaging member further being moveable between a disengaged orientation clear of the front portion of the seat rest portion of the vehicle seat, and an engaged orientation partially encompassing the seat rest portion of the vehicle seat adjacent to the front portion thereof.

14. The mount of claim 13, wherein the forward seat engaging member further comprises an extensible arm portion, the extensible arm portion further comprising the jaw portion adjacent to one end thereof and being retractably extendable across the front portion of the seat rest portion of the vehicle seat for engaging the jaw portion with the underneath portion thereof.

15. The mount of claim 9, wherein the collapsible stabilizer further comprises a pair of side stabilizer legs that are retractable relative to the support hub.

16. The mount of claim 15, wherein each of the pair of side stabilizer legs is further rotatably retractable relative to the support hub.

17. A device for mounting an object to a vehicle seat, the device comprising:
   a support hub for resting on a sitting surface of a seat rest portion of the vehicle seat, the support being adapted for stabilizing the object thereon;
   a collapsible stabilizer coupled to the support hub and being expandable for engaging the sitting surface of the vehicle seat rest portion, the collapsible stabilizer comprising:
      a pair of side stabilizer legs for stabilizing the support hub against yawing vehicle seat rest portion, wherein at least one of the pair of side stabilizer legs further being pivotably coupled to a corresponding side of the support hub, and
      a pair of fore and aft pitch stabilizer legs adapted for stabilizing the support hub against pitching on the vehicle seat rest portion,
         wherein the fore pitch stabilizer leg further comprises an end portion thereof distal from the support hub and extended adjacent to a front portion of the seat rest portion of the vehicle seat, and
         wherein the aft pitch stabilizer leg further comprises an end portion thereof distal from the support hub and extendible for engaging the vehicle seat between the seat rest portion thereof and a backrest portion thereof; and
   a forward anchor element coupled to the distal end of the fore pitch stabilizer leg and adapted for engaging an underneath portion of the seat rest portion of the vehicle seat adjacent to the front portion thereof; and
   a rear anchor element coupled to the distal end of the aft pitch stabilizer leg and adapted for engaging a rear portion of the seat rest portion of the vehicle seat adjacent to the backrest portion thereof.

18. The mount of claim 17, wherein the pair of side stabilizer legs are pivotably coupled to opposite sides of the support hub between the pair of fore and aft pitch stabilizer legs.

19. The mount of claim 18, wherein the aft pitch stabilizer leg is further telescopically adjustable relative to the fore pitch stabilizer leg.

20. The mount of claim 18, wherein the forward anchor element further comprises a jaw portion adjacent to one end of an arm portion, the arm portion being retractably extensible for moving the jaw portion between an engaged position engaging the underneath portion of the seat rest portion of the vehicle seat adjacent to the front portion thereof, and a disengaged position spaced away from the front portion of the vehicle seat rest portion.

* * * * *